United States Patent

[11] 3,581,137

| [72] | Inventors | Edward G. F. Arnott<br>Wilkinsburg;<br>Daniel W. Lewis, Pittsburgh, Pa. |
|---|---|---|
| [21] | Appl. No. | 744,832 |
| [22] | Filed | July 15, 1968 |
| [45] | Patented | May 25, 1971 |
| [73] | Assignee | Westinghouse Electric Corporation<br>Pittsburgh, Pa.<br>Continuation-in-part of application Ser. No.<br>741,370, July 1, 1968, which is a<br>continuation-in-part of application Ser. No.<br>657,123, July 31, 1967. |

[54] ELECTRIC LAMP HAVING AN ENVELOPE COMPOSED OF PHOTORESISTANT SODA-LIME SILICATE GLASS
16 Claims, 5 Drawing Figs.

[52] U.S. Cl. .................................................... 313/109,
106/52, 117/33.5, 313/112, 313/221
[51] Int. Cl. ............................................................. H01j 1/63,
H01j 61/30, H01j 61/35
[50] Field of Search............................................ 313/221,
109, 112; 106/52; 117/33.5

[56] References Cited
UNITED STATES PATENTS

| 1,292,147 | 1/1919 | Taylor | 106/54 |
|---|---|---|---|
| 1,830,902 | 11/1931 | Hood | 106/54 |
| 3,148,300 | 9/1964 | Graff | 313/221 |
| 3,253,174 | 5/1966 | Elmer et al. | 313/221X |
| 3,430,089 | 2/1969 | Sarver et al. | 313/109 |
| 3,146,120 | 8/1964 | Upton et al. | 117/33.3 |
| 3,377,494 | 4/1968 | Repsher | 313/221X |

FOREIGN PATENTS

| 543,095 | 1/1932 | Germany | 106/52 |

OTHER REFERENCES

George W. Morey, " The Properties of Glass" 1954, pp. 76, 452, 453, 454.
Weyl, W. A., " Colored Glasses" 1959, pp. 212—217.

Primary Examiner—Roy Lake
Assistant Examiner—David O'Reilly
Attorneys—A. T. Stratton, W. D. Palmer and D. S. Buleza ABSTRACT: The light output and lumen maintenance of an electric lamp that generates both visible and ultraviolet radiations (e.g., a fluorescent, an incandescent, or a high-pressure mercury vapor discharge lamp) is enhanced by utilizing an envelope that is composed of a modified soda-lime silicate glass which has a low initial coefficient of absorption in the visible region (below about 0.05 cm.$^{-1}$), and inhibits the discoloration or "solarization" effect of impinging ultraviolet-radiation. The absorption coefficient in the visible region is maintained below approximately 0.4 cm.$^{-1}$ after prolonged exposure of the envelope to ultraviolet radiation by controlling the $Fe_2O_3$ content and adding selected amounts of $TiO_2$ or $MoO_3$, or mixtures thereof, to the glass during manufacture. The preferred ranges are between 0.8 percent and about 3 percent by weight $TiO_2$ and from about 0.5 percent to 1 percent by weight $MoO_3$ when these materials are added as separate components. The $Fe_2O_3$ content does not exceed about 0.07 percent by weight.

PATENTED MAY 25 1971

WITNESSES
Edwin E. Bassler
James F. Young

INVENTORS
Edward G. F. Arnott
& Daniel W. Lewis
BY
D. S. Buley
AGENT

ELECTRIC LAMP HAVING AN ENVELOPE COMPOSED OF PHOTORESISTANT SODA-LIME SILICATE GLASS

CROSS-REFERENCE TO RELATED APPLICATION

This application is a continuation-in-part of application Ser. No. 741,370 filed July 1, 1968, which application, in turn, is a continuation-in-part of application Ser. No. 657,123 filed July 31, 1967.

BACKGROUND OF THE INVENTION

This invention relates to electric lamps and has particular reference to improved fluorescent, incandescent and mercury-vapor lamps and to envelopes that enhance the performance of such lamps.

Among the factors which determine the light output and maintenance of an electric lamp are the optical and photosensitivity characteristics of the lamp envelope. In the case of a fluorescent lamp, the envelope is made from ordinary soda-lime silicate glass to reduce the manufacturing costs. It has been found that a typical glass of this type that is used for fluorescent glass tubing has an initial absorption coefficient of approximately 0.05 cm.¹¹ in the visible region and that it progressively increases to a value of over 0.5 cm.¹¹ as the lamp is burned and the envelope is irradiated with ultraviolet (UV) radiations generated by the discharge. This gradual loss of transmissivity is caused by the so-called "solarization" effect of the impinging UV radiations which produces a yellowish tint in the glass and thus progressively darkens the envelope. As far as the optical properties of the lamp envelope are concerned, the two key parameters are, accordingly, the absorption coefficient of the glass both initially and after exposure to intense UV radiation during the life of the lamp.

In the case of a fluorescent lamp discoloration may also occur at the inner surface of the envelope due to chemical reaction between mercury ions or other ions in the gaseous discharge and sodium or other ions present in the glass. Moreover, the phosphor that is coated onto the inner surface of the bulb may also be adversely affected by sodium or other constituents of the glass and cause a progressive loss of light output as the lamp is burned and the glass envelope is subjected to elevated operating temperatures and UV irradiation. It is known, for example, that the halophosphate type phosphors generally employed in fluorescent lamps are quite sensitive to sodium and sodium ions (and perhaps other constituents in the glass) and exhibit a drop in light output when such impurities diffuse into the phosphor. The chemical properties and stability of the glass envelope are, accordingly, also factors which could effect its transmissivity and the condition of the phosphor and, thus, the light output of the lamp during its life.

The light losses due to absorption are considerable. In a fluorescent lamp, for example, practically all of the light is generated by the phosphor coating which is deposited on the inner surface of the tubular glass envelope. Ordinarily, when light is generated within a transparent cylindrical tube, it is not totally reflected at the outer wall of the tube because, in such a geometry, none of the light can strike the outer surface at an angle of incidence greater than the minimum required for total internal reflection. This angle is approximately 41° for a material having an index of refraction of 1.52. For angles less than 33°, only 4 percent of the light will be reflected and most of this will pass through the inner wall into the tube, and so, will not be completely lost.

However, since there is a phosphor layer on the inner surface of a fluorescent lamp envelope, many of the phosphor particles will inherently make optical contact with the glass and, thus, light can enter the wall of the tubular envelope at an angle of incidence greater than 41°. A fraction of this light will, accordingly, be trapped in the envelope wall and be lost by absorption—especially since the glass as formed has an appreciable absorption coefficient in the visible region. In addition to this loss of trapped totally reflected light, there is a loss due to attenuation of the light rays which pass directly through the glass envelope without being trapped. Of course, as the glass solarizes and its absorption coefficient increases, the light losses resulting from such attenuation also increase.

Both of the aforementioned losses can be calculated. Using reasonable values for the amount of optical contact between the phosphor particles and the glass envelope and the aforementioned values for the absorption coefficients, the calculated total loss due to light absorption coefficients, the calculated total loss due to light absorption varies from 1.5 percent for a new lamp to 7 percent for a lamp near the end of its useful life, that is, after over 10,000 hours of burning. Actual lamp tests utilizing fluorescent lamps having bulbs made with special UV-transmitting glass (Corning 9821) that has a very low iron content (approximately 0.01 percent) and a low initial coefficient of absorption for visible light have shown that 2 percent of the light was absorbed at zero hours and that the absorption gradually increased to 3.5 percent after only 3,000 hours or burning.

Specially formulated soda-lime glasses having low coefficients of absorption for visible light and others which inhibits solarization are known in the art. However, they either require the removal of iron and other impurities from the raw mix materials, and are thus too expensive for use in the lamp industry, or require the use of additives, such as $Sb_2O_3$, which are costly and render the widespread use of the glass in lamp envelopes economically impractical. A fluorescent lamp having a $Sb_2O_3$-containing soda-lime glass bulb is disclosed in U.S. Pat. No. 3,094,641 issued June 18, 1963, to W. C. Gungle et al.

A soda-lime glass containing from 1 to 2 percent $TiO_2$ or PbO which prevents the glass from becoming discolored when exposed to sunlight and is used in vault or sky-lighting windows is disclosed in U.S. Pat. No. 1,776,562 issued Sept. 23, 1930 to Bernard Long.

A fluorescent lamp envelope made of soda-lime silicate glass which absorbs UV radiations shorter than 3,200 A and contains from 0.2 to 0.8 percent by weight $TiO_2$ and from 0.03 to 0.4 percent by weight $Fe_2O_3$ is disclosed in Japanese patent Publication No. 32—3733 of R. Yokota published June 14, 1957. A fluorescent lamp envelope which has this same property but is composed of soda-lime silicate glass that contains from 0.1 to 0.2 percent $Fe_2O_3$, from 0.5 to 0.8 percent $TiO_2$ and from 0.2 to 0.3 ZnS is disclosed in Japanese Pat. Publication No. 32—2981 of the same inventor published May 20, 1957.

SUMMARY OF THE INVENTION

It is accordingly the general object of the present invention to provide an electric lamp that generates both visible and UV radiations and has an improved lumen maintenance and the light output throughout its useful life.

A more specific object is the provision of fluorescent, incandescent and high-pressure mercury vapor lamps that have glass envelopes which retain a high degree of transmissivity in the visible region during the useful life of the lamps and can be manufactured from inexpensive industrial-grade raw materials.

Still another object is the provision of an inexpensive photoresistant glass envelope for a fluorescent, an incandescent or a high-pressure mercury vapor discharge lamp which has physical properties that permits the lamp to be made on high-speed lamp-making machines presently in use.

The aforesaid objects and other advantages are achieved in accordance with the present invention by controlling the iron content of the soda-lime silicate glass composition presently being used in fluorescent lamp tubing and then modifying the glass by adding critical quantities of a selected UV-absorbing material that inhibits the discoloration effect of impinging UV radiation during the life of the lamp and may also decrease the initial value of the absorption coefficient. Specifically, the $Fe_2O_3$ content of the glass does not exceed about 0.07 percent by weight and between 0.8 percent and about 10 percent by weight of $TiO_2$ or from about 0.5 percent to 1 percent by weight of $MoO_3$ is added to increase the photoresistivity of the glass. The preferred range for $TiO_2$ is between 0.8 percent and about 3 percent by weight.

The amount of $Fe_2O_3$ is maintained below the prescribed limit by using raw materials that will provide the desired amounts of the various oxides in the finished glass. Since there are sands available having iron contents which meet this requirement, the glass can be prepared from industrial-grade sands which do not have to be processed or cleansed in any way. The glass is thus comparable in cost with conventional soda-lime silicate glasses now being used for fluorescent lamp tubing.

From a cost standpoint, $TiO_2$ is preferred as the UV-absorbing material since it is used widely in the paint industry and is thus not as expensive as $MoO_3$. The absorption coefficient of the modified glass both prior to and after prolonged exposure to intense UV irradiation is lower than conventional soda-lime silicate glass and provides a corresponding improvement in the light output of the fluorescent lamp throughout its useful life. Its ability to resist solarization also makes the glass suitable for use in incandescent lamp bulbs and in the protective outer envelopes of high-pressure mercury vapor lamps.

BRIEF DESCRIPTION OF THE DRAWING

A better understanding of the invention will be obtained by referring to the accompanying drawing, wherein.

Figure 1:
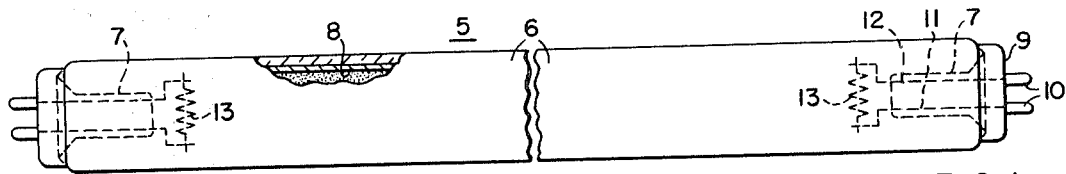
FIG. 1 is an elevational view of an improved fluorescent lamp having an envelope composed of the photoresistant soda-lime silicate glass of this invention.

velope 6 is charged with a predetermined amount of mercury and a suitable starting gas, such as neon or a mixture of neon and argon at a fill pressure of approximately 2 mm., in accordance with standard lamp-making practice.

The envelope 6 in accordance with the present invention is a fabricated from a soda-lime silicate glass that contains no more than about 0.07 percent by weight $Fe_2O_3$ and critical amounts of a UV-absorbing material selected from the group consisting of $TiO_2$, $MoO_3$ and mixtures thereof. Preferably, the soda-lime silicate glass is of the same basic type as that presently being used for fluorescent lamp tubing but which is modified in accordance with the invention by the selection of the sand and other raw materials and by the addition of the aforementioned UV-absorbing material, during the melting process, to provide a finished glass that has the desired composition and solarization-inhibiting properties. In addition, to the basic constituents (viz, $SiO_2$, $Na_2O$, $CaO$ and/or $MgO$) the glass also contains minor amounts of additional constituents such as $K_2O$, $As_2O_3$ and $Al_2O_3$. The composition of such modified glasses and that of conventional soda-lime glass are given below in table I. The permissible ranges and preferred amounts of the various oxides in the modified glasses are expressed in percentages by weight as calculated from the batch.

TABLE I

| | Percent by weight | | |
|---|---|---|---|
| | Range | Preferred | Conventional |
| Constituent: | | | |
| $SiO_2$ | 60–75 | 72.5 | 72.5 |
| $Na_2O$ | 5–18 | 15.5 | 16.5 |
| $CaO$ | 4–13 { | 5.3 | 5.3 | 5.3 |
| $MgO$ |  | 3.7 | 3.7 | 3.7 |
| $Al_2O_3$ | 0.5–3.4 | 1.9 | 1.85 | 1.7 |
| $K_2O$ | 0.1–2 | 0.23 | 0.23 | 0.18 |
| $TiO_2$ | 0.5–10 { | | 2.0 | |
| $MoO_3$ |  | 0.75 | | |
| $Fe_3O_3$ | ≦0.07 | 0.05 | 0.05 | 0.05 |
| $As_2O_3$ | 0.01–2 | 0.07 | 0.07 | 0.07 |

$Sb_2O_3$ can be substituted, if desired, for the $As_2O_3$ as the fining agent.

The relative amounts of $Fe_2O_3$ and the UV-absorbing material (or materials) are quite critical, as indicated by the variations in the coefficients of absorption of the series of glasses listed in table II below and depicted graphically in FIGS. 2 and 3.

TABLE II.—ABSORPTION COEFFICIENTS ($CM^{-1}$) OF STANDARD SODA-LIME SILICATE GLASS AND MODIFIED GLASSES BEFORE AND AFTER EXPOSURE TO UNFILTERED ULTRAVIOLET RADIATION

| | Before | | After | |
|---|---|---|---|---|
| Code and glass type | 4,800 A. | 5,800 A. | 4,800 A. | 5,800 A. |
| (S) Standard—contains .05% $Fe_3O_3$ | 0.072 | 0.058 | 0.808 | 0.437 |
| (A) Modified—contains .05% $Fe_3O_3$ and 0.25% $TiO_2$ | 0.044 | 0.047 | 0.202 | 0.100 |
| (B) Modified—contains .05% $Fe_2O_3$ and 0.5% $TiO_3$ | 0.042 | 0.055 | 0.198 | 0.125 |
| (C) Modified—contains .05% $Fe_2O_2$ and 0.6% $TiO_2$ | (¹) | (¹) | 0.115 | 0.063 |
| (D) Modified—contains .05% $Fe_3O_3$ and 0.8% $TiO_2$ | (¹) | (²) | 0.093 | 0.048 |
| (E) Modified—contains .05% $Fe_2O_3$ and 1.0% $TiO_2$ | (³) | 0.026 | 0.078 | 0.052 |
| (F) Modified—contains .05% $Fe_2O_3$ and 1.5% $TiO_2$ | (²) | (¹) | 0.080 | 0.060 |
| (G) Modified—contains .05% $Fe_3O_3$ and 0.5% $MoO_3$ | 0.147 | 0.150 | 0.264 | 0.166 |
| (H) Modified—contains .05% $Fe_3O_3$ and 0.75% $MoO_3$ | 0.057 | 0.066 | 0.185 | 0.114 |
| (I) Modified—contains .05% $Fe_2O_3$ and 1.0% $MoO_3$ | 0.107 | 0.115 | 0.187 | 0.101 |
| (J) Standard—contains no $Fe_2O_3$, $TiO_2$, or $MoO_3$ | 0.012 | 0.019 | 3.16 | 1.77 |
| (K) Standard—contains no $Fe_2O_3$, $TiO_2$, $MoO_3$, or $As_2O_3$ | 0.054 | 0.029 | 4.18 | 2.78 |

¹ No measurement made.
² Too low for measurement.

DESCRIPTION OF THE PREFERRED EMBODIMENTS

In FIG. 1 there is shown a fluorescent lamp 5 having a tubular glass envelope 6 that is sealed at each end by glass stems 7 and is interiorly coated with a layer 8 of a suitable phosphor, such as calcium halophosphate, that is responsive to UV radiations. The sealed ends of the envelope are fitted with base members 9 having the usual pin contacts 10 that are connected to a pair of lead wires 11 and 12 sealed through the respective stems 7. The inner ends of the lead wires are attached to suitable electrodes 13 which emit electrons and sustain the arc discharge when the lamp is energized. The en- The glasses listed in table II were prepared by melting the raw mix constituents (reagent grade) in platinum crucibles at 1500° C. for 2 to 3 hours and then pouring the molten glass onto graphite slabs. They were then annealed by slowly cooling them from a temperature of 550° c. The resulting plates of glass were then ground and polished to a thickness of 0.038 inches (the approximate thickness of a fluorescent lamp bulb) and the absorption in the visible region (4000—7000 A) was measured while a Model 14 Cary recording spectrophotometer while the samples were immersed in an oil contained in a Pyrex absorption cell which has a path length of 1 centimeter. The oil, having a refractive index close to that of the glass, was used to minimize or eliminate reflection losses. After the initial measurements were taken, the plates were irradiated with intense UV radiations by mounting them side by side 6 inches from a 200 watt high-pressure mercury vapor arc tube fitted with a reflector. The plates were exposed to the arc tube for 16 hours and the absorption measurements in the visible region were again taken.

As a control, a sample was made of a glass having the same composition as that of conventional fluorescent lamp tubing which contains 0.05 percent $Fe_2O_3$. This control sample is designated "standard" glass S in table II. The other glasses A to K were of the same basic composition except for the changes indicated.

As will be noted from the data in table II, the series of $TiO_2$-modified soda-lime silicate glasses (glasses A through F) have a lower absorption coefficient both before and after UV irradiation than the unmodified glass S, with the optimum reduction occurring with glasses D to F having 0.05 percent $Fe_2O_3$ and between 0.8 and 1.5 percent $TiO_2$. These glasses thus have excellent optical properties and photoresistance.

While the series of glasses containing $MoO_3$ (glasses G to I) are not quite as good as the $TiO_2$-containing glasses, they are superior to the standard glass S, as shown by the marked reduction of the absorption coefficients after UV irradiation.

Even though the $MoO_3$-modified glasses tend to increase the initial coefficient of absorption compared to the standard glass S, they did effect a marked reduction in absorption after UV irradiation showing that they experienced less discoloration and thus would be quite suitable as regards inhibiting light losses die to solarization of the lamp envelope.

Surprisingly, it was found that glasses free of $Fe_2O_3$ were more susceptible to darkening under UV irradiation than glasses which contain controlled amounts of $Fe_2O_3$ and a selected UV-absorbing material. This is illustrated by glasses J and K in table II. As will be noted glass J is identical to the standard glass S, except for the absence of $Fe_2O_3$, and, while it had a lower initial absorption coefficient, its coefficient after UV irradiation was much higher compared to glass S. Glass K, which is also of the same basic composition as the standard glass S but devoid of both $Fe_2O_3$ and $As_2O_3$, had an even higher absorption coefficient both before and after UV irradiation indicating that even small amounts of $As_2O_3$ absorb UV radiation and thus enhance the photoresistance of the glass. From 0.01 to 2 percent by weight of $As_2O_3$ is thus preferably included in the formulation as a UV-absorber, in which case the total content of UV-absorbing material is maintained between about 0.51 percent to 12 percent by weight. The $Fe_2O_3$ content is also preferably kept as low as possible consistent with the economic necessity of using low cost industrial-grade sands.

Figure 2:
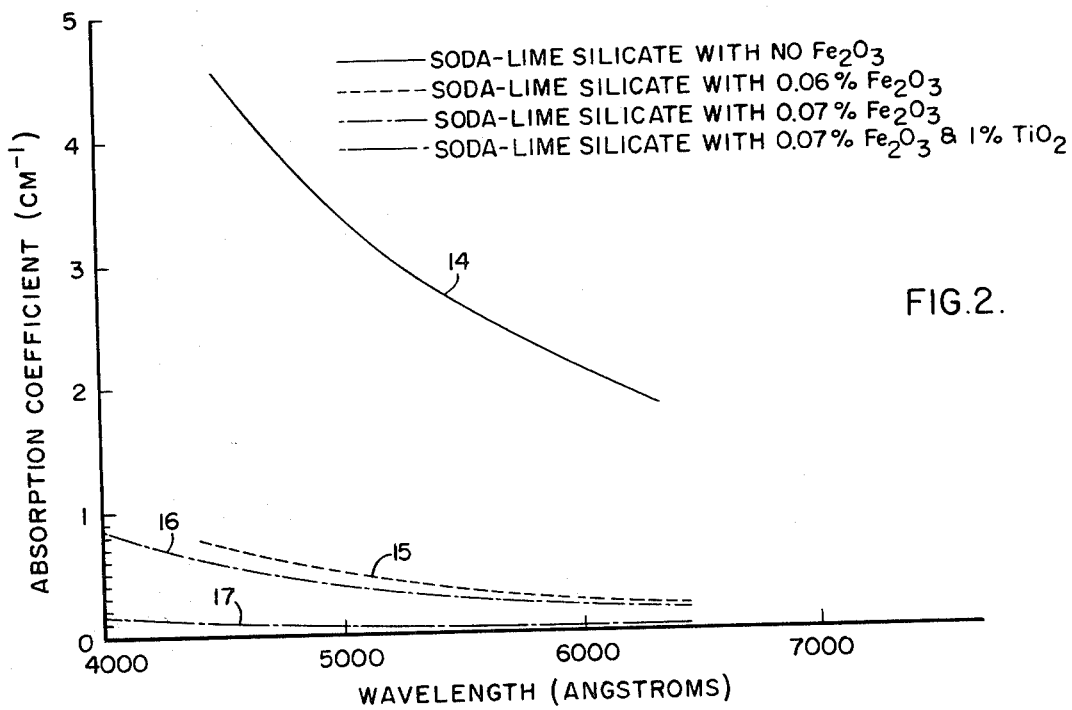
FIG. 2 is a graph illustrating the light-absorption characteristics of various glasses and a $TiO_2$-containing glass of the present invention after exposure to UV radiation.
Figure 3:
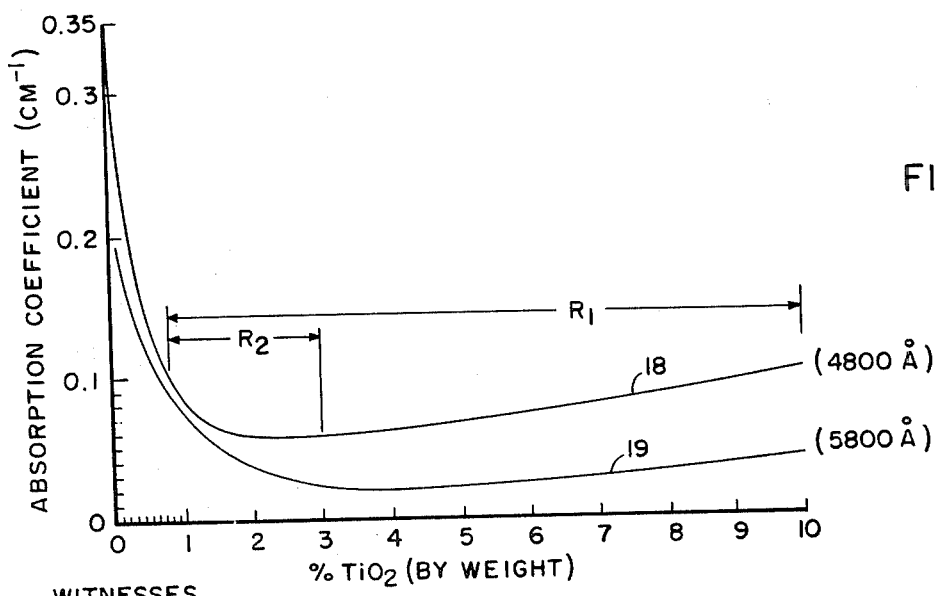
FIG. 3 is a graph illustrating the marked reduction in the light-absorbing characteristic of a UV-irradiated soda-lime silicate glass that has been modified by adding selected amounts of $TiO_2$ in accordance with the invention.

The importance of limiting the iron content and maintaining the $TiO_2$ content within certain limits is also shown by the graphs depicted in FIGS. 2 and 3. As indicated by curve 14 of FIG. 2, a conventional soda-lime silicate glass of the type presently used in fluorescent lamp tubing, but devoid of $Fe_2O_3$, has an absorption coefficient after UV irradiation that increases sharply as the wavelength of the light being transmitted decreases (from approximately 6400 A to 4000 A). The coefficient of absorption for this particular glass in the visible region increased from a value of about 1.8 cm.$^{11}$ in the yellow-red region to approximately 4.5 cm.$^1$1 in the blue-green region of the spectrum, indicating that it was severely discolored by the impinging UV.

An identical glass containing 0.06 percent $Fe_2O_3$ (which is the amount usually present in fluorescent lamp tubing glass) was less subject to discoloration, as indicated by curve 15, which shows that the coefficient of absorption was approximately 0.25 cm.$^1$1 at 6400 A and gradually increased to a value of about 0.8 cm.$^1$1 at 4400 A.

The same glass containing 0.07 percent $Fe_2O_3$ was slightly more resistant to UV-discoloration, as indicated by curve 16.

However, the same glass with 0.07 percent $Fe_2O_3$ and 1 percent $TiO_2$ exhibited excellent photoresistance, as indicated by curve 17 which shows that the coefficient of absorption at 6400 A dropped to less than 0.1 cm.$^1$1 and then increased very gradually to about 0.15 cm.$^1$at 4000 A. The addition of 1 percent $TiO_2$ thus "desensitized" the glass, so to speak, to the discoloring effect of UV radiation and converted it into a glass that retains its light-transmissivity to a very high degree.

The UV light source used to irradiate the glasses discussed above was a 200 watt high-pressure mercury vapor arc tube that produced 1.1 watts of 2537 A radiation, measured at the wall of the arc tube. On the basis of the physical dimensions of the arc tube and the distance between the latter and the glass plates, the total UV dosage applied to the plates was approximately 0.96 milliwatts per $cm^2$ of 2537 A radiation. In a clear four foot 40 watt T12 fluorescent lamp approximately 15 milliwatts per $cm^2$ of this same radiation strikes the inside walls of the bulb. However, in a fluorescent lamp coated with phosphor, the latter allows only about 3 percent of the generated UV to reach the glass envelope. The 2537 A flux reaching the lamp envelope is thus 3 percent of 15 milliwatts/$cm^2$, or about 0.45 milliwatts/$cm^2$. Hence, the glasses listed in the table II and depicted in FIG. 2 received about double the amount of 2537A radiation as does the glass in a fluorescent lamp envelope. The comparative tests were, accordingly, an accelerated or force test as regards the amount of solarization or darkening produced by UV irradiation. The term "intense ultraviolet irradiation" as used in this specification and in the appended claims accordingly means an amount of irradiation by 2537 A at least equivalent to that received by the inner wall of an energized conventional 40 watt T12 fluorescent lamp.

The amount of $TiO_2$ that can be added to the modified glass is not limited to 1 percent by weight but can vary within a rather broad range, as illustrated by the graph shown in FIG. 3. The data on which this graph is based was obtained by adding from 0.1 percent to 10 percent by weight of $TiO_2$ to a conventional soda-lime silicate glass that contained 0.07 percent $Fe_2O_3$ and is used for fluorescent lamp tubing. The samples were then irradiated for 30 minutes by placing them against a clear UV-transmitting quartz section of a low-pressure mercury vapor discharge lamp which was operated at an arc current and an ambient temperature which simulated those of a standard 40 watt fluorescent lamp. Since the quartz section of the envelope of the discharge lamp was clear and devoid of phosphor coating, glass samples were subjected to about thirty times the dosage of 2537A radiation as that which would be received by the envelope of a conventional fluorescent lamp that is operated for the same period of time.

As indicated by curve 18 of FIG. 3, the absorption coefficient of these $TiO_2$-modified glasses in the 4800 A region decreased sharply to a value of 0.1 cm.$^{11}$ as the $TiO_2$ content was increased from 0.1 percent to 0.8 percent by weight, reached a minimum of about 0.06 cm.$^1$1 at about 2 percent $TiO_2$, and then increased gradually to 0.1 cm.$^{11}$ when the $TiO_2$ content reached 10 percent by weight.

Curve 19 representing the absorption in the 5800 A region was similar but reached a minimum of 0.02 cm.$^1$1 at about 3 percent $TiO_2$ and then slowly increased to 0.04 cm.$^1$1 as the $TiO_2$-content was increased to 10 percent by weight.

Surprisingly, the glasses containing such relatively large amounts of $TiO_2$ did not crystallize and their melt viscosity appeared to be about the same as similar glasses without titania. Their working properties were also very similar, as is shown by table III below.

TABLE III.—WORKING PROPERTIES OF CONVENTIONAL AND $TiO_2$—MODIFIED SODA-LIME SILICATE GLASS TUBING

| Glass type | Softening temp.[1] °C. | Annealing point,[2] °C. | Strain point,[3] °C. |
|---|---|---|---|
| Conventional | 693 | 515 | 469 |
| Modified (1% $TiO_2$) | 697 | 520 | 475 |
| Modified (3% $TiO_2$) | 705 | 531 | 491 |
| Modified (5% $TiO_2$) | 708 | 540 | 503 |
| Modified (10% $TiO_2$) | 720 | 567 | 532 |

[1] Log viscosity=7.65.
[2] Log viscosity=13.0.
[3] Log viscosity=14.5.

As will be noted, the TiO₂ additive has little effect on the working properties of the glass, particularly in amounts up to 3 percent by weight. However, even the higher temperatures required for 5 percent and 10 percent TiO₂ contents could be obtained by readjusting the sealing fires, etc. Thus, fluorescent lamps having bulbs made from TiO₂-modified soda-lime silicate glasses of the present invention can be manufactured on the same high-speed manufacturing equipment now in use.

While the permissible range (R1 in FIG. 3) for the TiO₂ content extends from between 0.8 percent and about 10 percent by weight, the greatest reduction of the absorption coefficient after UV-irradiation is achieved with between 0.8 percent and 3 percent by weight of TiO₂ and this range (R2) is preferred. This range is also preferred because it will give the maximum degree of improvement at the least cost. Specific TiO₂ contents of from about 1 percent to 2 percent are also preferred for these reasons.

While there are at present no test data on the working properties of glasses containing MoO₃ as an additive in the quantities listed in table II, it is believed that such properties would also be quite close to those of conventional soda-lime glass. The preferred range in the case of MoO₃ is thus from about 0.5 percent to 1 percent by weight, and approximately 0.75 percent by weight appears to be optimum.

Mixtures of the two additives can also be used if desired. Thus, up to 1 percent by weight of TiO₂ can be replaced by MoO₃.

EMBODIMENT II

Figure 4:
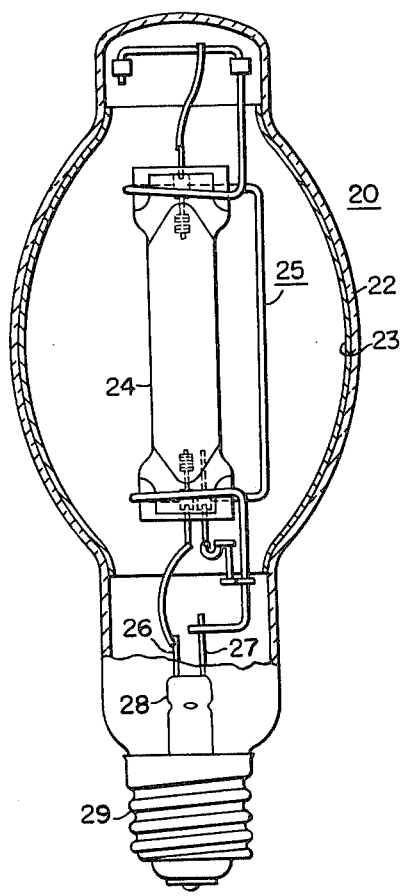
FIGS. 4 and 5 are elevational views of a high-pressure mercury vapor lamp and an incandescent lamp, respectively, having envelopes composed of the improved glass of this invention.

While the modified soda-lime silicate glasses of the present invention are particularly suited for use in conjunction with fluorescent lamps, they can also be used with advantage in high-pressure mercury vapor discharge lamps, particularly where cost is a factor and discoloration of the outer envelope during the life of the lamp is a problem. In FIG. 4, there is shown a lamp 20 of this type which has an outer glass envelope 22 that is fabricated from the improved soda-lime silicate glass of the present invention and is interiorly coated with a layer 23 of color-correcting UV-responsive phosphor, such as magnesium fluorogermanate for example, which adds red emission to the normal blue-green radiation generated by the enclosed arc tube 24. The latter is supported in axially extending position within the outer envelope 22 by a mount 25 which can be formed from a single piece of stiff wire in accordance with the teachings of U.S. Pat. No. 3,218,495 issued Nov. 16, 1965 to R. F. Hasell et al. The arc tube electrodes are electrically connected to a pair of rigid lead wires 26 and 27 and a suitable starting resistor by auxiliary conductors, and the lead wires are sealed through a glass stem 28 and connected to the contacts of a screw-type base 29 in the usual manner.

EMBODIMENT III

Figure 5:
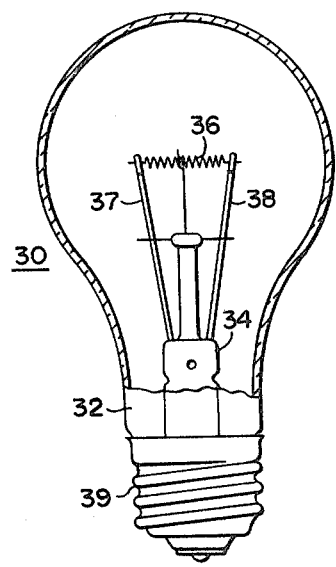

The improved glass of the present invention can also be used in the envelope of an incandescent lamp since a portion of the power consumed by the filament is expended in generating UV and infrared radiations in addition to visible radiation. The bulb is thus subjected to both UV and visible light and may tend to discolor, especially in high-wattage long-life lamps. A representative incandescent lamp 30 is shown in FIG. 5 and consists of an envelope 32 that is composed of the improved glass and contains a glass stem 34 and a coiled tungsten filament 36 which is held in place by a pair of lead wires 37 and 38 sealed through the stem. The sealed end of the envelope 32 is fitted with a suitable base member 39 in the usual manner.

It will be appreciated from the foregoing that the objects of the invention have been achieved in that an electric lamp, and, more specifically a fluorescent lamp, has been provided which has a glass envelope that exhibits less UV-discoloration as compared to lamps having bulbs made of conventional soda-lime silicate glass and which also may lower the initial value of the absorption coefficient in the visible region of the spectrum. This improvement is achieved by modifying the basic soda-lime silicate glass composition so that the Fe₂O₃ content does not exceed about 0.07 percent by weight and between 0.8 percent and 10 percent by weight of TiO₂ or from about 0.5 percent to 1.0 percent by weight of MoO₃ is included as a UV-absorbing additive.

While the manner in which the controlled iron and UV-absorbing constituents achieve the improved results is not known, it is believed that it may be due to the elimination or reduction of the color centers formed either by trapping of the electrons in the oxygen-deficient regions of the glass or by trapping of holes at sites of nonbridging oxygen ions. In the case of a fluorescent lamp which is coated with a phosphor such as a halophosphate type phosphor (a calcium halophosphate phosphor that is activated with antimony and manganese, for example) that is adversely affected by sodium or sodium ions, the use of TiO₂ or MoO₃ may also serve to prevent sodium or sodium ions from diffusing to the inner surface of the bulb and poisoning the phosphor. Such halophosphate-type phosphors are well known in the art and are disclosed in U.S. Pat. No. 2,488,733 issued Nov. 22, 1949 to A. H. McKeag et al. The TiO₂ and MoO₃ may also prevent such sodium or sodium ions from chemically reacting with mercury or other ions in the discharge and forming a deposit that discolors the inner surface of the envelope, at the phosphorbulb interface.

In addition, it is well known that all glasses are more or less subject to attack by water, the most vulnerable point of attack being at oxygen atoms not joining two silicon atoms, that, at nonbridging oxygen atoms. However, a –Si–O–Si–bonds can also be hydrolyzed.

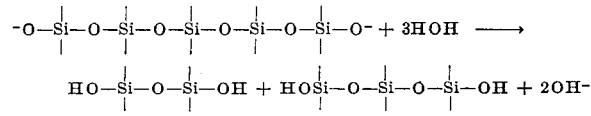

As metal oxides, the cations of which have a charge greater than one, are introduced into the composition, the glass becomes more resistant to attack by water. This is due to the fact that the cation of the added oxide coordinates with oxygens of the glass, thus protecting them from attack by water or its component ions. The greater the positive charge of the added cation, the smaller its size and the larger its coordination number, the more effective it will be in increasing the water resistance of the glass. For a detailed discussion of this phenomenon see "The Constitution of Glass," Vol. II: Part Two (pp. 1103 et seq.) by W. A. Weyl and E. C. Marboe (Interscience Publishers, 1967).

Because of the high charge and small size (high field strength) and large coordination numbers of $Ti^{+4}$ and $Mo^{+6}$ their presence in the improved glass of the present invention makes it less vulnerable to attack by water and, therefore, less likely to contain the elements of water which could be dislodged by ion bombardment of the mercury discharge in the operating lamp and contaminate the lamp. Water in the presence of mercury ion can also produce mercuric oxide which could darken the phosphor and reduce the light output of the lamp.

Whatever the mechanism, comparative 40 watt T12 "cool white" fluorescent lamp tests have shown that after 100 hours burning a gain of 26 lumens has been obtained by using envelopes containing 0.06 percent Fe₂O₃ and 1.18 percent TiO₂, and that this increased to 31 lumens (1 percent gain) at 500 hours. As is well known, "cool white" fluorescent lamps employ calcium halophosphate-type phosphors. Other lamps have exhibited gains as high as 50 lumens after several hundred hours burning.

While several embodiments have been illustrated and described, it will be appreciated that various modifications

We claim:

1. In combination with an electric lamp having means that generates both ultraviolet and visible radiations when the lamp is energized, an envelope enclosing said radiation-generating means and composed of soda-lime silicate glass that contains $Fe_2O_3$ and an ultraviolet-radiation absorbing material selected from the group consisting of $TiO_2$, $MoO_3$ and mixtures thereof, the amount of said ultraviolet-radiation absorbing material in the case of $TiO_2$ being between about 0.8 percent and about 10 percent by weight, the amount of said ultraviolet-radiation absorbing material in the case of $MoO_3$ being from about 0.5 percent to 1 percent by weight, and the total amount of said ultraviolet-radiation absorbing material in the case of mixtures of $TiO_2$ and $MoO_3$ being from about 0.5 percent to 10 percent by weight with the mixture containing less than 1 percent by weight of $MoO_3$ and the balance being $TiO_2$, the amount of said ultraviolet-radiation absorbing material being so correlated relative to the $Fe_2O_3$ content that the coefficient of absorption of the glass at 5800 A initially is below about 0.150 cm.[-1] and the chemical and optical stability of the glass is such that the progressive discoloration of the envelope by impinging ultraviolet radiation generated by the energized lamp is inhibited and the light output of the lamp during its useful life is thereby enhanced.

2. The combination set forth in claim 1 wherein;
said ultraviolet-radiation absorbing material comprises between about 0.8 percent and about 10 percent by weight $TiO_2$, and
said glass also contains an additional ultraviolet-radiation absorbing material consisting of from 0.01 percent to 2 percent by weight $As_2O_3$.

3. The combination set forth in claim 1 wherein;
said ultraviolet-radiation absorbing material comprises from about 0.5 percent to 1 percent by weight $MoO_3$, and said glass also contains from 0.01 percent to 2 percent by weight $As_2O_3$.

4. The combination set forth in claim 1 wherein;
said ultraviolet-radiation absorbing material comprises between 0.8 percent and 3 percent by weight $TiO_2$, and the $Fe_2O_3$ content of the glass is between about 0.05 percent and 0.07 percent by weight.

5. The combination set forth in claim 1 wherein said glass contains about 0.05 percent by weight $Fe_2O_3$ and about 1.5 percent by weight $TiO_2$.

6. The combination set forth in claim 1 wherein;
said lamp comprises a fluorescent lamp, and
said envelope is of tubular configuration and interiorly coated with a phosphor that is responsive to ultraviolet-radiation and is adversely affected by sodium or sodium ions.

7. The combination set forth in claim 6 wherein said phosphor is of the halophosphate type.

8. The combination set forth in claim 7 wherein said phosphor is calcium halophosphate activated by antimony and manganese.

9. The combination set forth in claim 1 wherein;
said lamp comprises a high-pressure mercury vapor discharge lamp, and
said radiation-generating means comprises an arc tube that is disposed within said envelope.

10. The combination of claim 9 wherein the inner surface of said envelope is coated with a layer of ultraviolet-responsive phosphor.

11. The combination set forth in claim 1 wherein said lamp comprises an incandescent lamp.

12. The combination set forth in claim 1 wherein said glass has the following composition:

| Constituent | Percent by weight |
|---|---|
| $SiO_2$ | 60–75 |
| $Na_2O$ | 5–18 |
| $CaO + MgO$ | 4–13 |
| $Al_2O_3$ | 0.5–3.4 |
| $K_2O$ | 0.1–2 |
| $TiO_2$ | 0.8–10 |
| $Fe_2O_3$ | ≤0.07 |
| $As_2O_3$ | 0.01–2 |

13. The combination set forth in claim 1 wherein said glass has the following composition:

| Constituent | Percent by weight |
|---|---|
| $SiO_2$ | 71.3 |
| $Na_2O$ | 15.5 |
| $CaO$ | 5.3 |
| $MgO$ | 3.7 |
| $Al_2O_3$ | 1.85 |
| $K_2O$ | 0.23 |
| $TiO_2$ | 2.0 |
| $Fe_2O_3$ | 0.05 |
| $As_2O_3$ | 0.07 |

14. The combination set forth in claim 4 wherein said glass also contains from 0.01 percent to 2 by weight of a material selected from the group consisting of $Sb_2O_3$ and $As_2O_3$.

15. The combination of claim 4 wherein said glass contains about 0.05 percent by weight $Fe_2O_3$ and from 0.01 percent to 2 percent by weight $Sb_2O_3$.

16. The combination set forth in claim 1 wherein;
said ultraviolet-radiation absorbing material comprises from about 0.5 percent to 1 percent by weight $MoO_3$,
the $Fe_2O_3$ content of the glass is between about 0.05 percent and 0.07 percent by weight, and
the amounts of the $Fe_2O_3$ and $MoO_3$ constituents are sufficient to maintain the absorption coefficient of the glass at 4800 A and 5800 below approximately 0.4 cm.[-1] during a major portion of the useful life of the lamp.

UNITED STATES PATENT OFFICE
CERTIFICATE OF CORRECTION

Patent No. 3,581,137          Dated May 25, 1971

Inventor(s) Edward G.F. Arnott, Daniel W. Lewis

It is certified that error appears in the above-identified patent and that said Letters Patent are hereby corrected as shown below:

In the Abstract, lines 7 and 10, "cm.$^{11}$" should read -- cm.$^{-1}$ --.
Column 1, lines 24 and 25, "cm.$^{11}$" should read -- cm.$^{-1}$ --.
Column 4, in Table II, glass (D), under item headed <u>Before</u> and subheaded <u>5,800A.</u>, "(2)" should read -- (1) --.
Column 4, in Table II, glass (E), under item headed <u>Before</u> and subheaded <u>4,800A.</u>, "(3)" should read -- (2) --.
Column 4, in TAble II, glass (F), under item headed <u>Before</u> and subheaded <u>4,800A.</u>, "(2)" should read -- (1) --.
Column 4, line 72, "while" should read -- with --.
Column 4, line 74, "has" should read -- had --.
Column 5, line 31, "die" should read -- due --.
Column 5, line 61, "cm.$^{11}$" should read -- cm.$^{-1}$ --.
Column 5, lines 62, 69, 70 and 76, "cm.$^{11}$" should read -- cm.$^{-1}$ --.
Column 6, line 1, "cm.$^{1}$" should read -- cm.$^{-1}$ --.
Column 6, lines 50 and 53, "cm.$^{11}$" should read -- cm.$^{-1}$ --.
Column 6, lines 52, 56 and 57, "cm.$^{1}$1" should read -- cm.$^{-1}$ --.
Column 7, line 46, "still" should read -- stiff --.
Column 8, line 30, ", that," should read -- , that is, --.
Column 8, line 31, delete "a".
Column 9, line 24, "cm.$^{11}$" should read -- cm.$^{-1}$ --.
Column 10, line 58, "cm.$^{11}$" should read -- cm.$^{-1}$ --.

Signed and sealed this 5th day of September 1972.

(SEAL)
Attest:

EDWARD M. FLETCHER, JR.  
Attesting Officer

ROBERT GOTTSCHALK  
Commissioner of Patents